US012810400B2

(12) United States Patent
Blawat et al.

(10) Patent No.: US 12,810,400 B2
(45) Date of Patent: Nov. 24, 2026

(54) METHOD, COMPUTER PROGRAM AND ELECTRONIC DEVICE FOR TONE MAPPING

(71) Applicant: Dream CHIP Technologies GmbH, Garbsen (DE)

(72) Inventors: Meinolf Blawat, Garbsen (DE); Saikat Kamal, Garbsen (DE)

( * ) Notice: Subject to any disclaimer, the term of this patent is extended or adjusted under 35 U.S.C. 154(b) by 299 days.

(21) Appl. No.: 18/291,361

(22) PCT Filed: Aug. 20, 2021

(86) PCT No.: PCT/EP2021/073182
§ 371 (c)(1),
(2) Date: Jan. 23, 2024

(87) PCT Pub. No.: WO2023/020705
PCT Pub. Date: Feb. 23, 2023

(65) Prior Publication Data
US 2024/0281941 A1 Aug. 22, 2024

(51) Int. Cl.
*G06T 5/92* (2024.01)
*G06T 5/40* (2006.01)

(52) U.S. Cl.
CPC .................. *G06T 5/92* (2024.01); *G06T 5/40* (2013.01); *G06T 2207/10024* (2013.01); *G06T 2207/20008* (2013.01); *G06T 2207/20208* (2013.01)

(58) Field of Classification Search
CPC ... G06T 5/92; G06T 5/40; G06T 2207/10024; G06T 2207/20008; G06T 2207/20208
USPC .......................................................... 382/274
See application file for complete search history.

(56) References Cited

U.S. PATENT DOCUMENTS

2018/0097992 A1 4/2018 Douady-Pleven et al.

OTHER PUBLICATIONS

Ozcinar, Cagri. "Comprehensive Study on High Dynamic Range Tone Mapping with Subjective Tests.", 2017, University of Tartu, Master's Thesis. (Year: 2017).*
International Search Report from corresponding International Patent Application No. PCT/EP21/73182, dated May 12, 2022.

(Continued)

*Primary Examiner* — Jonathan S Lee
(74) *Attorney, Agent, or Firm* — Renner, Otto, Boisselle & Sklar, LLP

(57) ABSTRACT

A method, a computer program and an electronic device for tone mapping a HDR input image into a LDR output image are proposed, the method comprising:
a) obtaining a luminance component of the input image,
b) obtaining an initial tone mapping curve, which is a global tone mapping curve,
c) obtaining a luminance histogram that represents the luminance distribution of the input image,
d) determining a plurality of clusters of the luminance distribution from the luminance histogram, wherein each cluster has a centroid,
e) generating an adapted tone mapping curve by adapting, for each cluster, the slope of the initial tone mapping curve depending on a concentration of luminance values in that cluster, wherein a higher concentration of luminance values results in a greater slope of the adapted tone mapping curve,
f) generating the output image by applying the adapted tone mapping curve to at least the luminance component of the input image.

19 Claims, 5 Drawing Sheets

(56) References Cited

OTHER PUBLICATIONS

C.-M. Tsai and Z.-M. Yeh, "Contrast enhancement by automatic and parameter-free piecewise linear transformation for color images," in *IEEE Transactions on Consumer Electronics*, vol. 54, No. 2, pp. 213-219, May 2008, doi: 10.1109/TCE.2008.4560077.

Jonghyun Bae, Kyungman Kim, Yu-Jin Yun and Jaeseok Kim, "Adaptive tone-mapping operator for HDR images based on image statistics," *TENCON 2011—2011 IEEE Region 10 Conference*, Bali, Indonesia, 2011, pp. 1435-1438, doi: 10.1109/TENCON.2011.6129047.

J. W. Lee, R.-H. Park and S. Chang, "Local tone mapping using the K-means algorithm and automatic gamma setting," in *IEEE Transactions on Consumer Electronics*, vol. 57, No. 1, pp. 209-217, Feb. 2011, doi: 10.1109/TCE.2011.5735504.

* cited by examiner

METHOD, COMPUTER PROGRAM AND ELECTRONIC DEVICE FOR TONE MAPPING

FIELD OF THE INVENTION

In general, the invention concerns the field of high dynamic range (HDR) imaging. More particularly, the invention is related to a method for tone mapping a high dynamic range (HDR) input image into a low dynamic range (LDR) output image.

Moreover, the invention is related to a computer program having program code means adapted to perform such a method.

Furthermore, the invention is related to an electronic device adapted to perform such a method.

BACKGROUND OF THE INVENTION

HDR images typically offer a dynamic range of 14-16 bits to 20-24 bits, while traditional LDR images (or standard dynamic range images) typically only offer a dynamic range of 8-10 bits. Therefore, HDR images allow preserving the details of real-world scenes that contain very bright, but also very dark areas much better than conventional LDR images. Luminance is a photometric quantity that is used in photo and video technology to measure the brightness of pixels. HDR images allow capturing dynamic ranges similar to the human eye, which can detect a luminance range of up to approximately $10^{14}$.

However, common displays are only able to reproduce the luminance range of conventional LDR images. Currently, there are no displays available that can reproduce the luminance range of HDR images, but only very few expensive displays are able to reproduce a luminance range of approximately 12 bits.

Due to these limitations of display contrast, the luminance range of input HDR images has to be reduced in order to be displayed on a regular display. This process of converting an HDR image to an LDR image is commonly referred to as tone mapping.

In the context of this application, which is related to a method for tone mapping a high dynamic range input image into a low dynamic range output image, the term “low dynamic range output image” can generally refer to any image with a dynamic range that is smaller than the dynamic range of the high dynamic range input image. In particular, in certain embodiments, the low dynamic range can be a conventional low dynamic range image, e. g. with a dynamic range of 8 to 10 bits and/or a standard dynamic range (SDR) image.

The input image and the output image can be part of an input video sequence and an output video sequence, respectively.

The objectives of tone mapping methods can be different depending on the particular application. For example, different criteria have to be met to produce images matching the Human Visual System (HVS) on the one hand and for Machine Vision System (MVS) applications on the other hand.

With regard to the HVS, for example, in order to display HDR images on a standard display with a displayable dynamic range of 8 to 10 bits, the HDR images, which may comprise a luminance range of 20 to 24 bits, have to be compressed in a way that all dark, mid-tone and bright image contents are clearly distinguishable by the naked human eye. Moreover, at the same time, the reproduction of the image on the display shall look as realistic and natural as possible to the human observer.

On the other hand, with regard to MVSs, tone mapping methods that compress the HDR image (with a luminance range of, for example, 20 to 24 bits) to an LDR image (with a luminance range of, for example, 8 to 10 bits) should allow the MVS to process the tone-mapped image as effectively as possible. In most cases, this means that all structures (edges, textures) in the image have to be preserved as good as possible.

In general, a common tone mapping objective in both HVS and MVS applications is to minimize loss of image information. For this purpose, it is essential to preserve contrast, in particular local contrast, appropriately with regard to the intended application.

From the state of the art, a variety of different tone mapping operators is known that have been developed to meet these challenges. They can be divided into two main types: global tone mapping operators and local tone mapping operators.

On the one hand, global tone mapping operators (or global tone mapping methods) map every pixel of the image in the same way, independent of its position or surrounding pixels in the image. In general, global tone mapping operators are non-linear functions (also called tone mapping curves) that are based on a global luminance and/or other global properties of the particular image. As the same function is applied to every pixel of the particular image, global tone mapping methods are simple and fast and require only a small amount of processing power. Therefore, they can be implemented, for example based on look-up tables, using low-cost hardware. However, these global methods often cause a significant loss of contrast, in particular with regard to local image details, as only global properties of the image are considered.

On the other hand, local tone mapping operators (or local tone mapping methods) map each pixel of the image differently, in particular depending on local image properties, for example depending on surrounding pixels. When designed correctly, these methods can achieve very good results in terms of preserving local contrast as it is beneficial with regard to the intended application. However, these local tone mapping methods are prone to artifacts like halo effect and ringing and their output may appear unrealistic to the human observer. Moreover, these methods are generally more complicated than global tone mapping methods and hence require significantly more processing power in most cases.

From US 2018/0097992 A1, for example, a global tone mapping method and a corresponding system are known that involve computing a first histogram for luminance values of the input image, accessing a target histogram for the image, and computing a transfer function based on the first histogram and the target histogram. The tone-mapped image is produced by applying the transfer function to the pixel values of the input image.

SUMMARY OF THE INVENTION

The present invention provides a method for tone mapping of HDR input images into LDR output images that offers an improved preservation of the image's details and contrast compared to conventional global tone mapping methods, but requires a smaller amount of processing power than complicated local tone mapping methods.

According to the invention, the method comprises at least the following steps:

a) obtaining a luminance component of the input image, b) obtaining an initial tone mapping curve, which is a global tone mapping curve, c) obtaining a luminance histogram that represents the luminance distribution of the input image, d) determining a plurality of clusters of the luminance distribution from the luminance histogram, wherein each cluster has a centroid, e) generating an adapted tone mapping curve by adapting, for each cluster, the slope of the initial tone mapping curve depending on a concentration of luminance values in that cluster, wherein a higher concentration of luminance values in the cluster results in a greater slope of the adapted tone mapping curve for that cluster, f) generating the output image by applying the adapted tone mapping curve to at least the luminance component of the input image.

The steps of the method do not have to be executed in the specified order and the invention is not limited accordingly, i. e. the alphabetic order of the letters does not imply a specific sequence of steps a) to f). For example, as matter of course, step b) could be executed after steps c) and d), or some of the method's steps could be executed in parallel.

In step a), a luminance component of the input image is obtained. Such a luminance component can be, for example, the luma component (luma channel) of a color space in which luminance intensity values and color tone values are separated, for example the luma component Y of the YCbCr color space (or Y' of the Y'CbCr color space). If the luminance component is a luma component of a color space in which luminance intensity values and color tone values are separated, as the luma component Y of the YCbCr color space, it can be necessary to transform the input HDR image to such a color space first. For example, if the input image is an RGB image, the RGB input image could be transformed to the YCbCr color space first.

However, the luminance component can generally also be any other component or combination of components of an arbitrary color space that represents the luminance of the image. For example, the luminance component could also be the green component G of the RGB color space, as it can represent the image's luminance sufficiently well. As a matter of course, the luminance component comprises a plurality of luminance values. In particular, the luminance component of the input image can comprise one luminance value for each pixel of the input image.

The terms "dynamic range" and "luminance range" are used equivalently in the context of this application.

In step b), an initial tone mapping curve is obtained, which is a global tone mapping curve. In other words, in step b), a global tone mapping function (or global tone mapping operator) is obtained that maps the input luminance values of an HDR input image to output luminance values of an LDR output image.

In an advantageous embodiment of the invention, the initial tone mapping curve and/or the adapted tone mapping curve can be implemented as a look-up table, respectively. Such embodiments of the invention provide the advantage that the tone mapping method can be implemented in a computationally efficient manner.

Moreover, in another advantageous embodiment of the invention, the initial tone mapping curve and/or the adapted tone mapping curve can be constructed by subsampling the HDR input image and interpolating between the subsampled values. As the dynamic range of the HDR input image can be very large, such embodiments of the invention provide the advantage that the required processing power can be further reduced.

In step c), a luminance histogram is obtained that represents the luminance distribution of the input image. In general, this luminance histogram can be obtained from the original HDR input image. However, as will be explained in greater detail below, the luminance histogram can also be obtained from a compressed version of the input image in order to reduce the processing power that is required for step c).

In step d), a plurality of clusters of the luminance distribution is determined from the luminance histogram. The number of clusters to be created in step d) can be a predetermined number. In particular, the number of clusters may be greater than 2 and smaller than 12. In particular, the number of clusters may be greater than 2 and smaller than 6. In particular, the number of clusters may be greater than 2 and smaller than 5. The number of clusters, however, can also be not predetermined. For example, the number of clusters can be determined by the applied clustering algorithm.

In step e), an adapted tone mapping curve is generated from the initial tone mapping curve. To this end, for each of the plurality of clusters that have been determined in step d), the slope of the initial tone mapping curve is adapted depending on a concentration of luminance values in that cluster, wherein a higher concentration of luminance values in the respective cluster results in a greater slope of the adapted tone mapping curve for that cluster. The concentration of luminance values in the respective cluster can be determined based on different metrics, including an amount of variation of the luminance values in the cluster and/or an absolute or relative number of luminance values in that cluster, which will be explained in more detail below.

In step f), the output image is generated by applying the adapted tone mapping curve to at least the luminance component of the input image.

The method according to the invention effectively avoids loss of relevant image information, e. g. object contours and textures. For this purpose, it is essential to preserve local contrast, which also comprises textural structures of the image. The invention is based on the insight that in order to avoid loss of local contrast—and hence loss of local image information—as far as possible, it is important that the tone mapping curve is sufficiently steep, i. e. has a sufficiently large slope, for those parts of the luminance range (HDR) that are dominant in the individual HDR input image. These parts of the luminance range are also referred to as dominant tonal range. The inventors have found that these dominant parts of the luminance range can be determined based on the concentration of luminance values from the luminance histogram. The reasons for this are twofold. On the one hand, if the luminance histogram shows a large concentration of luminance values in a certain part of the luminance range, this means that compressing the dynamic range in these parts would affect particularly large areas of the input image. On the other hand, if the luminance histogram locally indicates a large concentration of luminance values, this indicates that in these parts of the luminance range, the input image contains areas with low local contrast, where the luminance values of a pixel and its surroundings are particularly close to each other. These areas of the input image are particularly sensitive to compression.

In order to identify the different parts of the luminance range that are dominant in the input image, a clustering method is applied to determine a plurality of clusters of the luminance distribution from the luminance histogram. Known clustering algorithms, for example k-means clustering, can be used for this purpose. A large concentration of luminance values in that cluster indicates that the corresponding part of the luminance range is dominant in the input image. By increasing the slope of the tone mapping curve for those parts of the luminance range with a large concentration of luminance values in the input image, the input image's dominant tonal range is compressed to a lesser extent and hence contrast can be preserved. In other words, those parts of the luminance range that carry a particularly large amount of information in the input image are preserved from being compressed too heavily.

As a result, the invention effectively avoids loss of relevant image information, e. g. object contours, textures and details, by preserving contrast in the image's dominant tonal range, which is determined based on the concentration of luminance values for each cluster of the luminance distribution.

This effect is achieved by means of global tone mapping, as the adapted tone mapping curve—like the initial tone mapping curve—is a global tone mapping curve. Compared to local tone mapping methods, this results in significantly lower processing power requirements. Therefore, the invention can be advantageously be implemented using low-cost hardware.

According to an advantageous embodiment of the invention, it is proposed that step c) comprises

- compressing the input image and
- obtaining the luminance histogram from the compressed input image.

Such embodiments of the invention provide the advantage that the processing power necessary for processing the histogram and determining the clusters of luminance values in step d) can be greatly reduced.

In general, the luminance histogram can also be directly obtained from the HDR input image. However, due to the enormous size of the HDR tonal range (which may use 20 bits, 24 bits or even more bits), a large amount of processing power would be necessary for processing the histogram—in particular for determining the clusters of luminance values from the histogram in step d). Such processing power might not be available in common image processing pipelines and it may be undesirable or even impossible to equip image pipelines with such processing power.

Nevertheless, the scope of the application also comprises obtaining the luminance histogram from the uncompressed input image. The scope of the application hence also comprises obtaining the luminance histogram directly from the HDR input image.

According to another advantageous embodiment of the invention, it is proposed that the input image is compressed by applying a global tone mapping curve. In particular, the input image can be compressed by applying the initial tone mapping curve. In this case, the same tone mapping curve is used to compress the input image that is also used as a basis for generating the adapted tone mapping curve in step e).

Such embodiments of the invention provide the advantage that the input image can be compressed in a particularly efficient and computationally inexpensive manner, as the global tone mapping curve can be implemented, for example, as a look-up table. As a result, the required processing power can be reduced.

According to another advantageous embodiment of the invention, it is proposed that the initial tone mapping curve is based on the global tone mapping operator by Reinhard.

The global tone mapping operator by Reinhard (also referred to as Reinhard's tone mapping operator) is given by the equation $$L_{out}(x,y) = \frac{L_{in}(x,y)\left(1 + \frac{L_{in}(x,y)}{L_{white}^2}\right)}{1 + L_{in}(x,y)},$$

wherein $L_{out}$ is the displayable output luminance for pixel (x,y), $L_{in}$(x,y) is the (scaled) input luminance and $L_{white}$ is the smallest luminance that will be mapped to pure white. This global tone mapping operator has been presented in the paper "Photographic Tone Reproduction for Digital Images" by E. Reinhard, J. Ferwerda and P. Shirley in ACM Transactions on Graphics in May 2002. The term "Reinhard curve" refers to a global tone mapping curve that is constructed by applying Reinhard's global tone mapping operator.

According to another advantageous embodiment of the invention, it proposed that the initial tone mapping curve is a Reinhard curve.

Reinhard's global tone mapping operator is comparably simple and yet, for a conventional global tone mapping operator, provides good results with regard to the output image's quality. Therefore, such embodiments of the invention that use Reinhard's global tone mapping operator for the initial tone mapping operator, which forms the basis for the adapted tone mapping curve that is used to generate the output image, provide the advantage that they are simple to implement and at the same time result in a particularly good quality of the output image, especially in terms of preserving image contrast and relevant details.

According to another advantageous embodiment of the invention, it is proposed that in step d), the plurality of clusters is determined by k-means clustering.

Such embodiments of the invention provide the advantage that computationally efficient implementations of the well-known k-means clustering algorithms can be used to effectively determine a number of clusters of the input image's luminance distribution from the luminance histogram.

According to another advantageous embodiment of the invention, step d) comprises merging two or more clusters depending on the distance between these clusters and/or the centroids of these clusters, in particular if the distance is lower than a threshold.

In such embodiments, the merging of two or more clusters results in reducing the number of clusters if the clusters are too close to each other. Such embodiments of the invention hence provide the advantage that the number of clusters can be adapted to the individual input image and its luminance distribution. As a result, an inappropriately large number of clusters can be avoided.

According to another advantageous embodiment of the invention, the concentration of luminance values in the cluster is determined at least based on

- an amount of variation of the luminance values in that cluster and/or
- the number of luminance values in that cluster, in particular in relation to the total number of luminance values in the luminance histogram.

As explained above, the invention is based on the finding that in order to preserve important image details and local contrast, a sufficiently large slope of the tone mapping curve has to be ensured for those parts of the input image's luminance histogram that show a high concentration of luminance values.

For this purpose, the concentration of luminance values can be determined, for example, based on an amount of variation of the luminance values in the respective cluster.

The concentration can also be determined based on the dispersion (also referred to as variability, scatter or spread) of the luminance values in that cluster, as this reflects the amount of variation. The amount of variation and/or the dispersion of the luminance values can be quantified, for example, using common measures of statistical dispersion. Examples for such measures include standard deviation, variance and coefficient of variation.

The amount of variation and/or the dispersion of the luminance values can be estimated, e. g. by empirically determining typical amounts of variations from a plurality of images beforehand. In particular, different amount of variations can be estimated for different cluster centroids, i. e. for different positions of clusters within the luminance rage. Alternatively or additionally, the amount of variation and/or the dispersion can also be determined analytically from the input image (or from a compressed version of the input image, as explained above).

Alternatively or additionally, the concentration of luminance values can be determined based on the number of luminance values in the respective cluster. In particular, the concentration of luminance values can be determined based on the number of luminance values in that cluster in relation to the total number of luminance values in the luminance histogram. In other words, the concentration of luminance values can be determined based on the ratio of luminance values in the respective cluster.

Such embodiments of the invention provide the advantage that the concentration of luminance values can be reliably and efficiently determined and hence the slope of the adapted tone mapping curve can be set appropriately in step e).

According to another advantageous embodiment of the invention, it is proposed that in step e), for each cluster, the slope of the initial tone mapping curve is adapted within an adaptation area depending on the concentration of luminance values in that adaptation area, wherein the adaptation area includes a range of luminance values around the centroid of the cluster.

In other words, it is proposed that the concentration of luminance values is determined and the slope of the tone mapping curve is adapted in an area around the centroid of the cluster.

According to another advantageous embodiment of the invention, it is proposed that the size and/or the position of the adaptation area is limited by a lower boundary and an upper boundary both representing luminance values, wherein the lower boundary and/or the upper boundary are determined depending on

- the centroid of the respective cluster (i. e. the cluster's position in the luminance range) and/or
- an estimated or real amount of variation of the luminance values in the respective cluster and/or
- a distance between the centroids of different clusters, in particular between the centroid of the respective cluster and the centroid of a neighboring cluster.

The aforementioned embodiments of the invention, which rely on determining the concentration of luminance values and adapting the slope of the tone mapping curve in an adaptation area around the centroid of the cluster, provide the advantage that the tone mapping curve can be adapted specifically for those parts of the input image's luminance range that represent the dominant tonal range, which can be expected to be located around the cluster centroids. As a result, a particularly effective preservation of image contrast can be achieved.

According to another advantageous embodiment of the invention, it is proposed that step e) comprises determining a plurality of luminance zones, wherein each luminance zone covers a fraction of the luminance range, and adapting the slope of the initial tone mapping curve by adapting its output values for each luminance zone.

Such embodiments of the invention provide the advantage that they simplify the handling of the input image's luminance range, which can be very large, and yet allow adapting the slope of the tone mapping curve in a flexible manner, as the luminance zones can be defined depending on individual characteristics of the input image.

According to another advantageous embodiment of the invention, it is proposed that step a) comprises obtaining a luminance component and a number of chrominance components of the input image and step f) comprises applying the adapted tone mapping curve to the luminance component and the number of chrominance components.

In other words, it is proposed that the method according to the invention is not only applied to the luminance component, but also to at least one chrominance component of the input image. In particular, the number of chrominance components can comprise all chrominance components of the input image.

Such embodiments of the invention provide the advantage that the above-mentioned effects, in particular preserving important image details and local contrast, can be used for the tone mapping of the input image's color information. As the same adapted tone mapping curve can be used for the chrominance components that is also used for the luminance component, this allows processing all components of the input image very efficiently.

According to another advantageous embodiment of the invention, it is proposed that step f) additionally comprises desaturating the resulting chrominance components of the output image, in particular by applying a desaturation scaling factor to the chrominance components.

In general, tone mapping of colored HDR input images into LDR output images can have the undesired effect that certain areas of the output image may appear oversaturated, which may particularly apply to bright areas of the input image. To compensate this, the output image's chrominance components can be desaturated, for example, by applying a desaturation scaling factor that can be empirically determined. For example, the scaling factor can be implemented by means of a look-up table.

Therefore, such embodiments of the invention provide the advantage that an undesired oversaturation of the output image's chrominance components can be compensated.

According to another advantageous embodiment, it is proposed that step e) comprises, after adapting the slope of the initial tone mapping curve, smoothing the resulting adapted tone mapping curve, in particular by applying Bernstein polynomials and/or Bernstein-Bézier polynomials and/or Bézier curves.

Such embodiments of the invention provide the advantage that a smooth adapted tone mapping curve can be generated and applied to the output image.

The object of the invention is further achieved by a computer program having program code means adapted to perform a method as described above when the computer program is executed on a computer.

The object of the invention is further achieved by an electronic device that is adapted to perform a method as described above.

The electronic device can be, for example, a stand-alone integrated circuit (IC) or a part thereof. The electronic device can also be a system on a chip (SoC) or a part thereof. The electronic device can also be a part of an image processing pipeline and/or an image processing chain. The electronic device can also be a camera or a display or a part of a camera or a display. The electronic device can also be a system that comprises a camera and/or a display. The electronic device can also be a part of such a system.

BRIEF DESCRIPTION OF THE DRAWINGS

In the following, the invention will be explained in more detail using the exemplary embodiments schematically shown in the attached drawings. The drawings show the following.

DETAILED DESCRIPTION OF THE INVENTION

Figure 1:
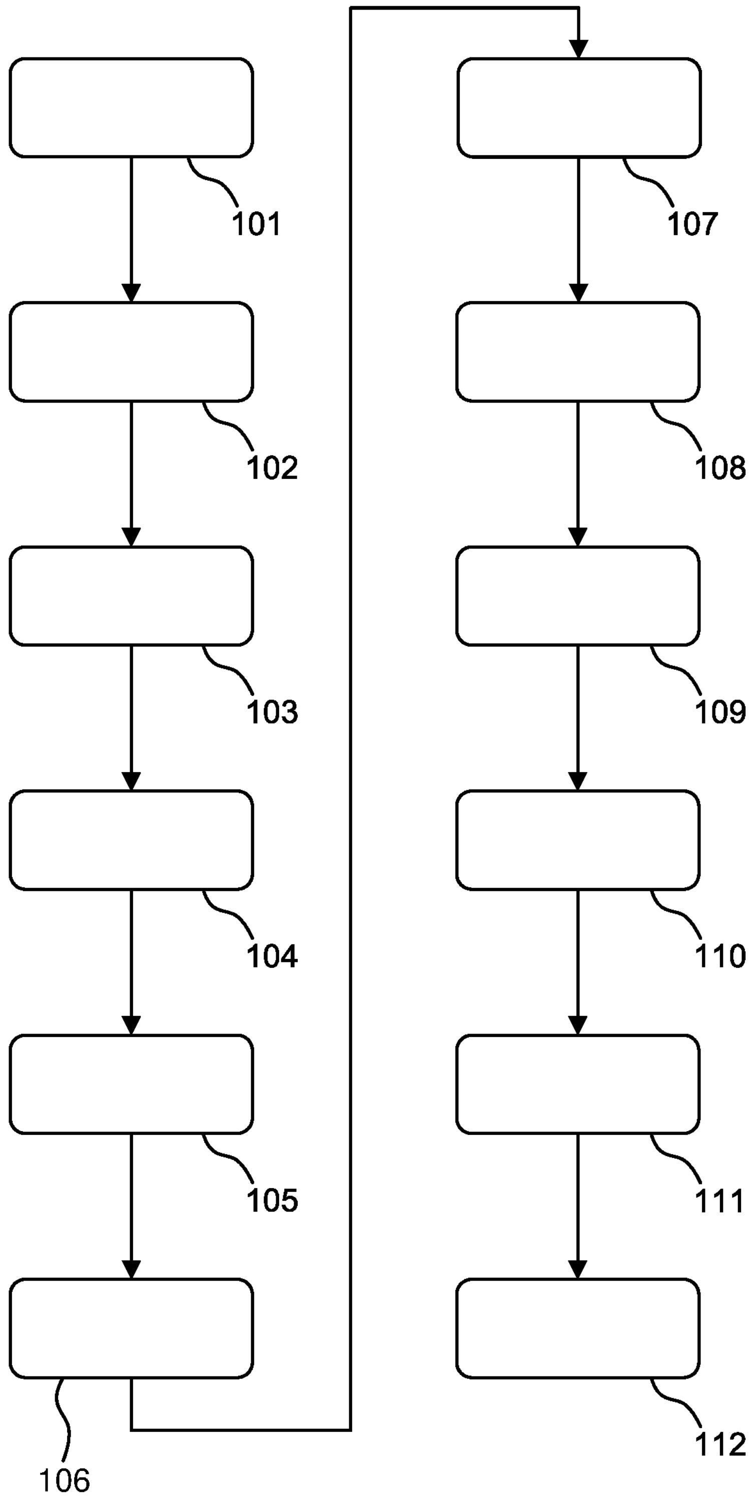
FIG. 1—a schematic representation of a method for tone mapping according to the invention.

FIG. 1 shows a schematic representation of an exemplary method for tone mapping a HDR input image into a LDR output image according to the invention. In this exemplary embodiment, the HDR input image has a dynamic range of 16 bits, whereas the LDR output image has a dynamic range of only 8 bits.

In steps 101 and 102, which correspond to step a) explained above, a luminance component and a number of chrominance components—in this exemplary embodiment two chrominance components—of the input image are obtained. For this purpose, in step 101, a HDR input image with an exemplary dynamic range of 16 bits is read, which initially has an RGB format. In the exemplary embodiment shown in FIG. 1, the luma channel Y (also referred to as luma component Y) of the YCbCr color model is used as the luminance component of the input image and the Cb and Cr channels (also referred to as Cb and Cr components) are used as the two chrominance components of the input image. Therefore, in step 102, the RGB input image is transformed to the YCbCr color model, which provides the HDR input image in YCbCr format with the Y channel as the luminance component and the Cb channel and the Cr channel as the chrominance components.

In step 103 shown in FIG. 1, which corresponds to step b) explained above, an initial tone mapping curve is obtained, which is a global tone mapping curve. In this exemplary embodiment, the global tone mapping operator by Reinhard is used for this purpose, which is given by $$L_{out}(x, y) = \frac{L_{in}(x, y)\left(1 + \frac{L_{in}(x, y)}{L_{white}^2}\right)}{1 + L_{in}(x, y)},$$

wherein $L_{out}$ is the displayable output luminance for pixel (x,y), $L_{in}$(x,y) is the (scaled) input luminance and $L_{white}$ is the smallest luminance that will be mapped to pure white.

The following steps 104 and 105 shown in FIG. 1 correspond to step c) explained above. In this exemplary embodiment, in step 104 the input image is compressed by applying the initial tone mapping curve, i. e. by applying Reinhard's global tone mapping operator to the luminance component Y of the HDR input image.

Afterwards, in step 105, a luminance histogram that represents the luminance distribution of the input image is obtained from the compressed input image.

Figure 2:
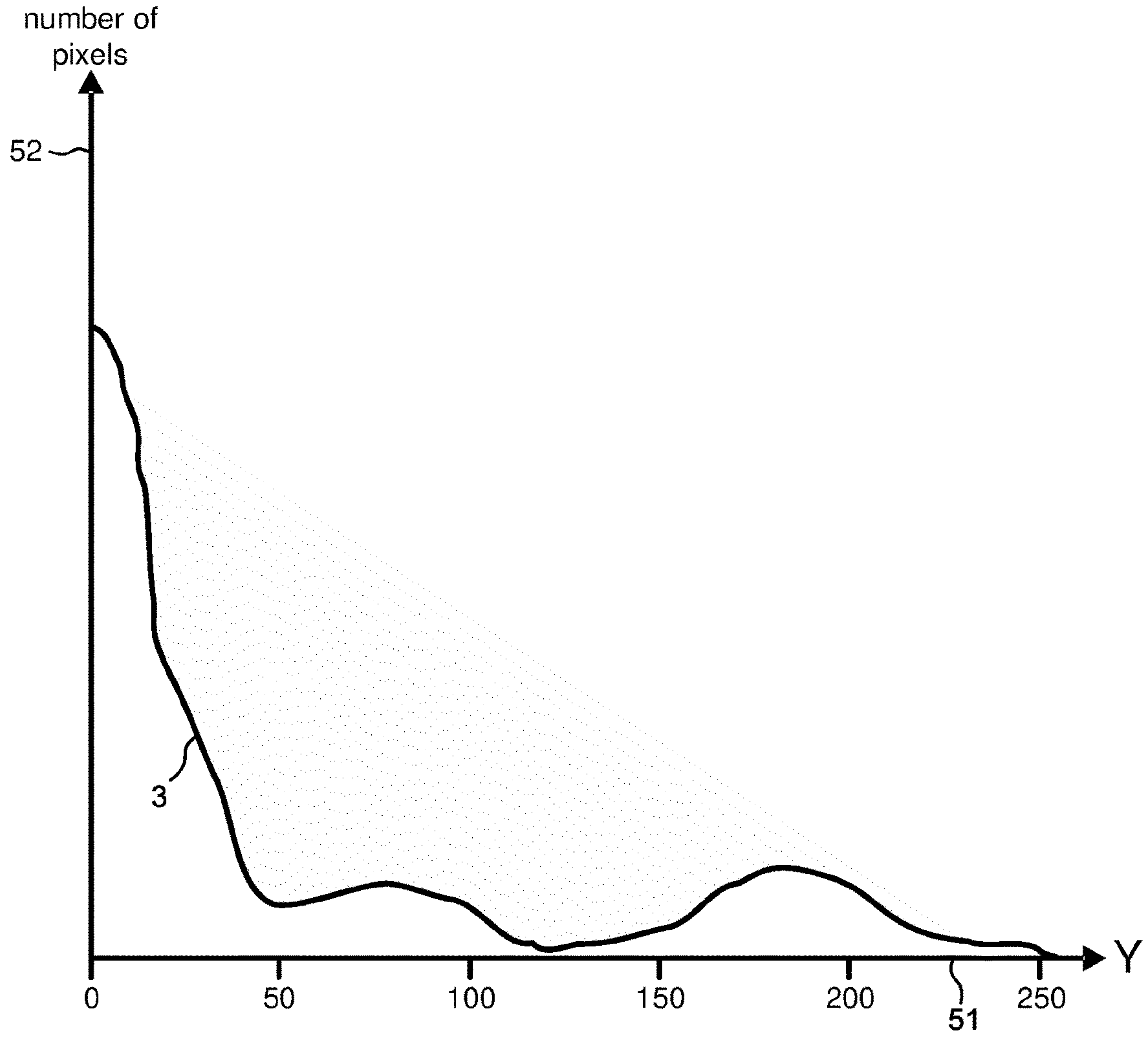
FIG. 2—a schematic representation of a luminance histogram.

FIG. 2 shows a schematic representation of an exemplary luminance histogram 3 as it is obtained in step 105 shown in FIG. 1, i. e. in step c) of the method according to the invention as described above. In the exemplary embodiment shown in FIG. 2, the luminance histogram 3 has been obtained from the compressed input image, which comprises a luminance range of 8 bits. The horizontal axis 51 of the diagram in FIG. 2 shows the luminance values Y between 0 and 255, wherein 0 represents the darkest pixels and 255 represents the brightest pixels. The vertical axis 52 shows the number of pixels for each luminance value.

Referring to FIG. 1 again, in step 106, a plurality of clusters of the luminance distribution is determined from the luminance histogram 3. Each of the determined clusters has a centroid. In the exemplary embodiment described here, the plurality of clusters is determined using a k-means clustering algorithm.

In this exemplary embodiment, the k-means clustering algorithm is initially started with a predetermined number of four clusters. However, an additional constraint has been defined to prevent determining clusters that are too close to each other. For this purpose, in each iteration of the algorithm, it is checked whether the distance between any pair of centroids of the clusters is smaller than a predetermined threshold. In this case, it is assumed that the two clusters (or their centroids, respectively) are too close to each other and the two clusters are merged. For this purpose, the new centroid that results from the merging is calculated as follows:

$$c_{ij} = \frac{n_i c_i + n_j c_j}{n_i + n_j},$$

wherein $c_{ij}$ is the centroid of the merged cluster, $c_i$ and $c_j$ are the centroids of the clusters i and j, respectively, which are merged as they are too close to each other, $n_i$ and $n_j$ are the numbers of luminance values (pixels) in clusters i and j, respectively.

As a result, in the exemplary embodiment described here, the number of clusters that are determined from the luminance histogram is reduced from the initial number of four clusters to a final number of three clusters, as otherwise two of the cluster centroids would have been too close to each other. Therefore, after completion of step 106, three clusters of the input image's luminance distribution have been determined that are defined by the cluster centroids.

In step 107 of the exemplary embodiment shown in FIG. 1, an adaptation area is determined for each of the three clusters of the luminance distribution of the input image. Each of the three adaptation areas is limited by a lower boundary and an upper boundary both representing luminance values.

In this exemplary embodiment, the lower boundary and the upper boundary are determined depending on the centroid of the respective cluster (the centroid's luminance value) and an estimated amount of variation of the luminance values in the respective cluster. For this purpose, the following closeness estimation metric is defined for each luminance value Y and each cluster i:

$$f_{close}(Y) = \sum_{i=1}^{n} e^{\frac{-(c_i - Y)^2}{2\sigma_i^2}},$$

wherein Y is a luminance value from the input image's luminance histogram, $c_i$ is the centroid of cluster i, n is the number of clusters and $$\sigma_i^2$$

is the estimated variation of the luminance values in cluster i, which serves as a metric for the estimated amount of variation. In this exemplary embodiment, Y is a luminance value of the compressed input image as explained above. In alternative embodiments, however, the original uncompressed HDR input image can also be used for this purpose. Those luminance values for which the closeness estimation metric $f_{close}$ is greater than a predefined threshold are included in the adaptation area. In particular, this threshold can be defined depending on the number of clusters. For example, the threshold can defined as 0.5 for a number of clusters greater than three and the threshold can be defined as 0.1 if the number of clusters is three and the threshold can be defined as 0.001 for a number of clusters smaller than three.

In alternative embodiments, the lower boundary and the upper boundary can be determined depending on the centroid of the respective cluster (the centroid's luminance value), an estimated or real amount of variation of the luminance values in the respective cluster and a distance between the centroids of the respective cluster and a neighboring cluster. For example, the upper and the lower boundary of the cluster's adaptation area could also be determined based on the following equations:

$$b_{u,i} = c_i + \left(\frac{\sigma_i}{4} + \frac{d_i}{4}\right),$$

$$b_{l,i} = c_i - \left(\frac{\sigma_i}{4} + \frac{d_i}{4}\right),$$

wherein $b_{u,i}$ and $b_{l,i}$ are the upper boundary and the lower boundary for cluster i, respectively, $c_i$ is the cluster centroid, $\sigma_i$ is the estimated standard deviation of the luminance values in cluster i, and $d_i$ is the distance between the centroids of cluster i and a neighboring cluster.

Figure 3:
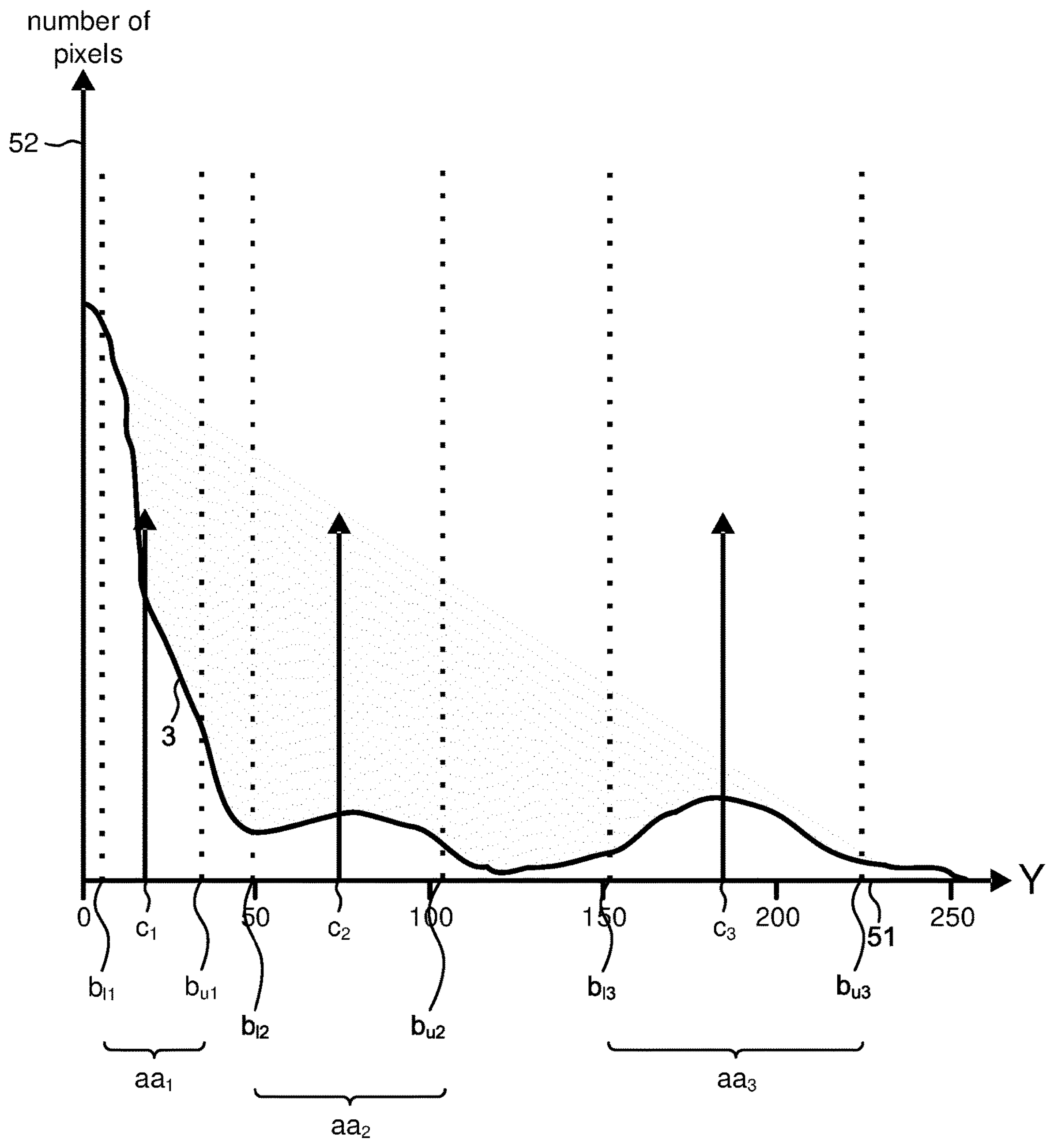
FIG. 3—a schematic representation of the luminance histogram and a plurality of clusters with their corresponding centroids and adaptation areas.

The result of steps 101 to 107 is schematically illustrated in FIG. 3. In addition to the luminance histogram 3 of FIG. 2, FIG. 3 shows the three clusters of the luminance distribution and their centroids $c_1$, $c_2$ and $c_3$ as they have been determined in step 106, wherein $c_1$ is the centroid of the first cluster, $c_2$ is the centroid of the second cluster and $c_3$ is the centroid of the third cluster. Moreover, FIG. 3 schematically shows the three adaptation areas $aa_1$, $aa_2$ and $aa_3$ that have been determined as previously described. Each of the adaptation areas is limited by a lower boundary and an upper boundary, wherein the adaptation area $aa_1$ of the first cluster is limited by the lower boundary $b_{l1}$ and the upper boundary $b_{u1}$, the adaptation area $aa_2$ of the second cluster is limited by the lower boundary $b_{l2}$ and the upper boundary $b_{u2}$, and the adaptation area $aa_3$ of the third cluster is limited by the lower boundary $b_{l3}$ and the upper boundary $b_{u3}$.

Referring to FIG. 1 again, a concentration of luminance values is determined for each adaptation area in step 108. In the exemplary embodiment described here, the concentration of luminance values is determined from the luminance histogram 3. In particular, for each of the three adaptation areas $aa_1$, $aa_2$, $aa_3$, the concentration of luminance values in that adaptation area, which corresponds to the concentration of luminance values in the corresponding cluster for this exemplary embodiment, is determined based on the number of luminance values in the adaptation area in relation to the total number of luminance values in the luminance histogram 3. In this exemplary embodiment, the number of luminance values in the adaptation area hence corresponds to the number of luminance values in the corresponding cluster.

In other embodiments, the concentration of luminance values can additionally or alternatively be determined, as described above already, based on an amount of variation of the luminance values in that cluster, in particular based on an amount of variation of the luminance values in the cluster's adaptation area.

Afterwards, in step 109 shown in FIG. 1, an adapted tone mapping curve is generated by adapting, for each cluster, the slope of the initial tone mapping curve depending on the concentration of luminance values in that cluster, wherein a higher concentration of luminance values in the cluster results in a greater slope of the adapted tone mapping curve for that cluster.

In step 110 shown in FIG. 1, the adapted tone mapping curve resulting from step 109 is smoothed by applying Bernstein-Bézier polynomials.

Figure 4:
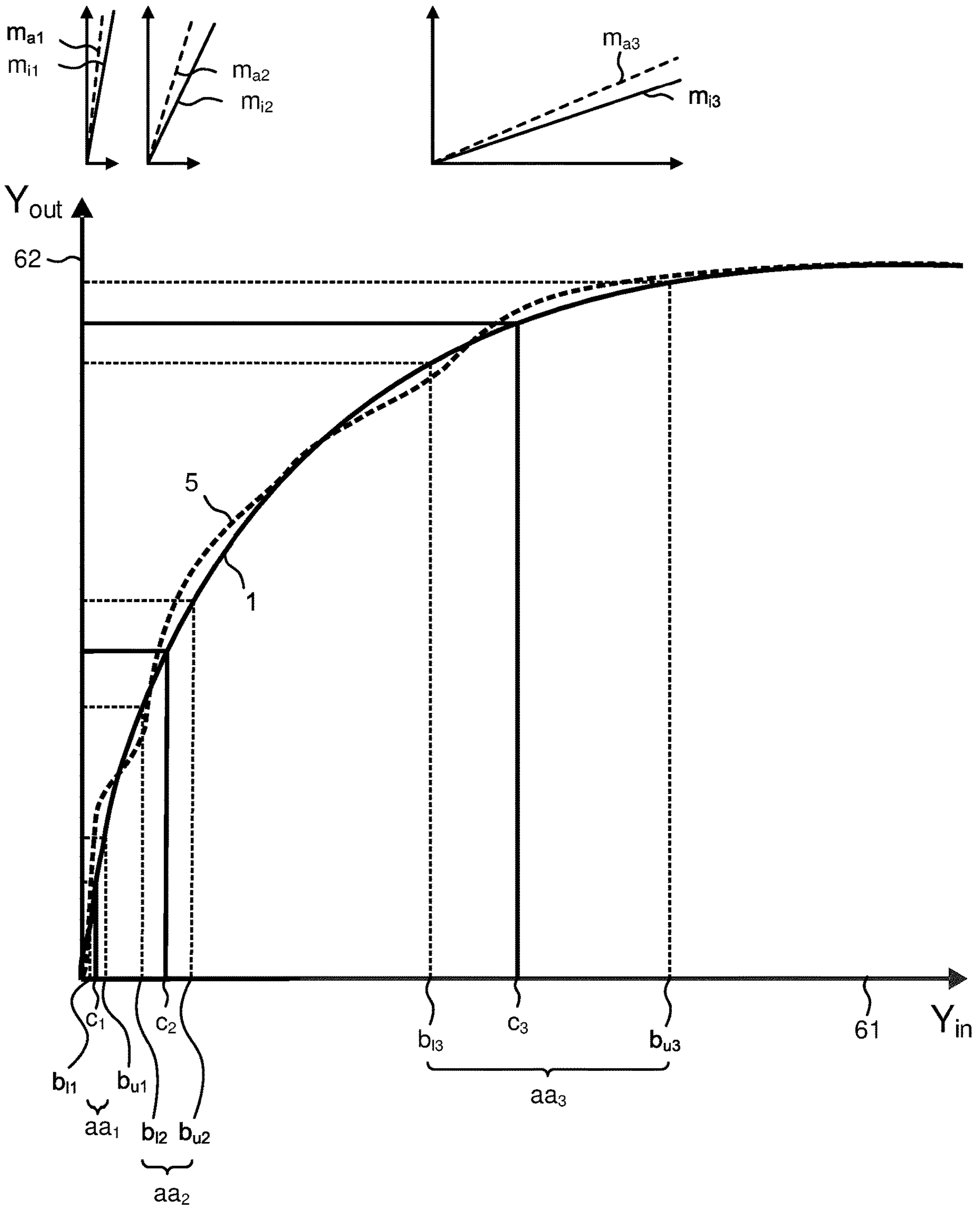
FIG. 4—a schematic representation of an initial tone mapping curve and an adapted tone mapping curve.

FIG. 4 schematically illustrates the results of steps 109 and 110, which correspond to step e) of the method according to the invention as explained above. For this purpose, FIG. 4 shows an exemplary initial tone mapping curve 1. The initial tone mapping curve 1 is based on Reinhard's global tone mapping operator as explained above and maps an HDR input luminance Yin on the horizontal axis 61 to an LDR output luminance $Y_{out}$ on the vertical axis 62. By adapting, for each of the three clusters represented by their respective centroids $c_1$, $c_2$ and $c_3$, the slope of the initial tone mapping curve 1 within the respective adaptation area $aa_1$, $aa_2$ and $aa_3$ of the corresponding cluster depending on the concentration of luminance values in the respective adaptation area $aa_1$, $aa_2$, $aa_3$, an adapted tone mapping curve 5 is generated. This is done in such a manner that a higher concentration of luminance values in the cluster, which is represented by the concentration of luminance values in the corresponding adaptation area $aa_1$, $aa_2$, $aa_3$ in this exemplary embodiment, results in a greater slope of the adapted tone mapping curve 5 for that cluster.

As can be seen in FIG. 4, within each of the adaptation areas $aa_1$, $aa_2$ and $aa_3$, the slope of the adapted tone mapping curve 5 is greater than the slope of the initial tone mapping curve 1. This is due to the relatively high concentration of luminance values around the cluster centroids $c_1$, $c_2$ and $c_3$. To illustrate these increased slopes of the adapted tone mapping curve 5, the average slopes within each adaptation area $aa_1$, $aa_2$, $aa_3$ for both the initial tone mapping curve 1 and the adapted tone mapping curve 5 are schematically shown in FIG. 4. It can be seen that the average slopes $m_{a1}$, $m_{a2}$ and $m_{a3}$ of the adapted tone mapping curve 5 are significantly greater than the average slopes $m_{i1}$, $m_{i2}$ and $m_{i3}$ of the initial tone mapping curve 1 for each of the three adaptation areas $aa_1$, $aa_2$ and $aa_3$.

This increase of the tone mapping curve's slope around the cluster centroids $c_1$, $c_2$, $c_3$, i. e. in those parts of the luminance range where the input image's concentration of luminance values is particularly high, results in an improved quality of the generated LDR output image, as local contrast and relevant image details of the input image can be effectively preserved.

Referring to FIG. 1 again, in step 111, the LDR output image is generated by applying the adapted tone mapping curve 5 to the luminance component Y and the chrominance components Cb and Cr of the HDR input image.

Finally, in step 112, the resulting chrominance components of the output image are desaturated by applying a desaturation scaling factor to the chrominance components.

Steps 111 and 112 shown in FIG. 1 hence correspond to step f) of the method according to the invention as explained above.

Figure 5:
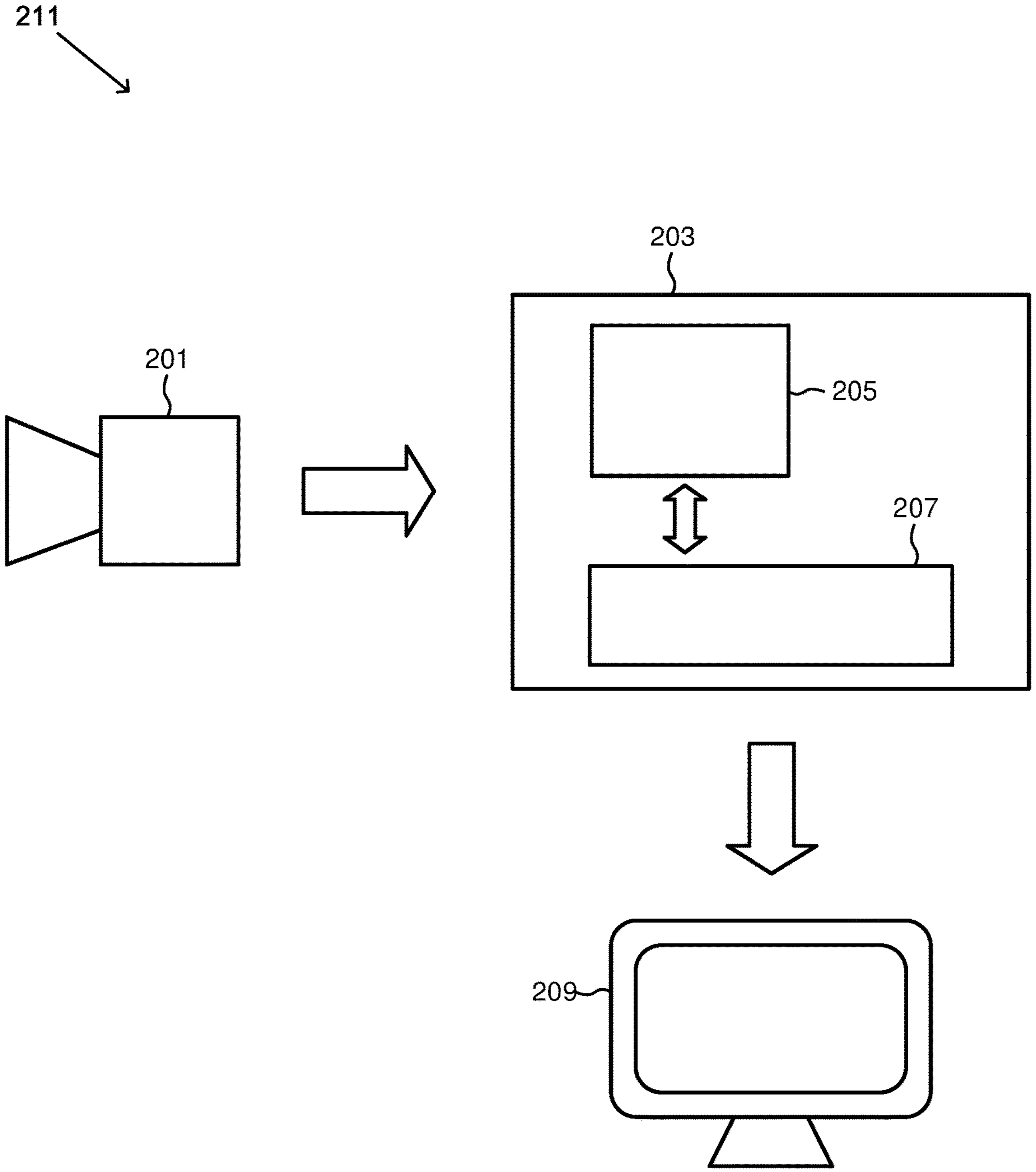
FIG. 5—a schematic representation of an exemplary image processing system comprising an electronic device according to the invention.

FIG. 5 shows an exemplary image processing system 211. The image processing system 211 comprises an HDR image sensor 201, which is a HDR video camera in the exemplary embodiment of FIG. 5. Moreover, the image processing 211 of FIG. 5 comprises a display unit 209, which is a conventional LDR display in this exemplary embodiment.

Furthermore, the image processing system 211 shown in FIG. 5 comprises an electronic device 203, which is an image processing unit in this exemplary embodiment. The image processing unit 203 has a data processing unit 205 and a memory 207 to store image data. The data processing unit 205 can be, for example, an appropriately programmed microprocessor, a digital signal processor (DSP), a graphics processing unit (GPU), a field-programmable gate array (FPGA), an application-specific integrated circuit (ASIC) or similar. The data processing unit 205 reads from and writes to the memory 207.

The HDR video camera 201 generates a sequence of HDR input images. The HDR video camera 201 is directly or indirectly connected with the image processing unit 203, which allows the image processing unit 203 to read the HDR input images generated by video camera 201. Each HDR input image read by the image processing unit 203 can be stored in memory 207.

The image processing unit 203 is adapted to perform the method as described above for tone mapping the HDR input image into a LDR output image.

After tone mapping the HDR input image into an LDR output image, i. e. after generating the LDR output image as previously explained, the generated LDR output image can be transmitted to the display unit 209, where the output image can be displayed.

This procedure can be repeated for each HDR input image of the HDR video sequence generated by the HDR video camera 201. This results in a generation of a LDR output video sequence, which is a sequence of LDR output images. The LDR output video sequence can be displayed on display unit 209.

Additionally or alternatively, the output image and/or the output video sequence can be stored in a memory and/or stored on a data storage unit and/or can be transmitted via a data transmission link.

What is claimed is:

1. A method for tone mapping a high dynamic range input image into a low dynamic range output image, the method comprising:

a) obtaining a luminance component of the input image, b) obtaining an initial tone mapping curve, which is a global tone mapping curve, c) obtaining a luminance histogram that represents the luminance distribution of the input image, d) determining a plurality of clusters of the luminance distribution from the luminance histogram, wherein each cluster has a centroid, e) generating an adapted tone mapping curve by adapting, for each cluster, the slope of the initial tone mapping curve depending on a concentration of luminance values in that cluster, wherein a higher concentration of luminance values in the cluster results in a greater slope of the adapted tone mapping curve for that cluster, and f) generating the output image by applying the adapted tone mapping curve to at least the luminance component of the input image.

2. The method of claim 1, wherein step c) comprises compressing the input image and obtaining the luminance histogram from the compressed input image.

3. The method of claim 2, wherein compressing the input image comprises applying a global tone mapping curve.

4. The method according to claim 1, wherein the initial tone mapping curve is based on the global tone mapping operator by Reinhard.

5. The method according to claim 1, wherein step d) includes determining the plurality of clusters by k-means clustering.

6. The method according to claim 1, wherein step d) comprises merging two or more clusters depending on the distance between these clusters and/or the centroids of these clusters.

7. The method according to claim 1, wherein the concentration of luminance values in the cluster is determined at least based on an amount of variation of the luminance values in that cluster and/or the number of luminance values in that cluster, in particular in relation to the total number of luminance values in the luminance histogram.

8. The method according to claim 1, wherein in step e) includes, for each cluster, adapting the slope of the initial tone mapping curve within an adaptation area depending on the concentration of luminance values in that adaptation area, wherein the adaptation area includes a range of luminance values around the centroid of the cluster.

9. The method according to claim 8, wherein the size and/or the position of the adaptation area is limited by a lower boundary and an upper boundary both representing luminance values, wherein the lower boundary and/or the upper boundary are determined depending on the centroid of the respective cluster and/or an estimated or real amount of variation of the luminance values in the respective cluster and/or a distance between the centroids of different clusters, in particular between the centroid of the respective cluster and the centroid of a neighboring cluster.

10. The method according to claim 1, wherein step e) comprises determining a plurality of luminance zones, wherein each luminance zone covers a fraction of the luminance range, and adapting the slope of the initial tone mapping curve by adapting its output values for each luminance zone.

11. The method according to claim 1, wherein step a) comprises obtaining a luminance component and a number of chrominance components of the input image and step f) comprises applying the adapted tone mapping curve to the luminance component and the number of chrominance components.

12. The method according to claim 11, wherein step f) additionally comprises desaturating the resulting chrominance components of the output image.

13. The method according to claim 1, wherein step e) comprises, after adapting the slope of the initial tone mapping curve, smoothing the resulting adapted tone mapping curve.

14. A non-transitory computer-readable medium comprising a computer program having program code means adapted to perform a method according claim 1 when the computer program is executed on a computer.

15. The electronic device adapted to perform a method according to claim 1.

16. The method according to claim 3, wherein applying the global tone mapping curve includes applying the initial tone mapping curve.

17. The method according to claim 6, wherein merging two or more clusters depending on the distance between these clusters and/or the centroids of these clusters is performed when the distance is lower than a threshold.

18. The method according to claim 12, wherein desaturating the resulting chrominance components of the output image includes applying a desaturation scaling factor to the chrominance components.

19. The method according to claim 13, wherein smoothing the resulting adapted tone mapping curve includes applying Bernstein polynomials and/or Bernstein-Bézier polynomials and/or Bézier curves.

* * * * *